United States Patent [19]

Shimomura et al.

[11] Patent Number: 4,645,384

[45] Date of Patent: Feb. 24, 1987

[54] INSERT CUTTER

[75] Inventors: Hiroshi Shimomura; Katsuyoshi Karino, both of Tokyo; Kazuo Iizuka, Warabi, all of Japan

[73] Assignee: Mitsubishi Kinzoku Kabushiki Kaisha, Tokyo, Japan

[21] Appl. No.: 860,794

[22] Filed: May 8, 1986

[30] Foreign Application Priority Data

May 25, 1985 [JP] Japan .................................. 60-78220

[51] Int. Cl.⁴ .............................................. B23C 5/20
[52] U.S. Cl. ..................... 407/42; 407/113; 408/199; 408/224; 408/713
[58] Field of Search ................... 407/34, 42, 113, 114; 408/223, 224, 186, 199, 713

[56] References Cited

U.S. PATENT DOCUMENTS

| | | | |
|---|---|---|---|
| 3,229,349 | 1/1966 | Leksell | 407/113 |
| 3,739,442 | 6/1973 | Lovendahl | 407/113 |
| 3,934,319 | 1/1976 | Schuler | 407/113 |
| 3,955,259 | 5/1976 | Gustafsson | 407/113 |
| 4,090,801 | 5/1978 | Faber | 407/113 |

FOREIGN PATENT DOCUMENTS

| | | | |
|---|---|---|---|
| 1627114 | 1/1970 | Fed. Rep. of Germany | 407/113 |
| 2252511 | 6/1973 | Fed. Rep. of Germany | 407/114 |
| 2307229 | 8/1973 | Fed. Rep. of Germany | 407/114 |
| 951624 | 3/1964 | United Kingdom | 407/113 |
| 848152 | 7/1981 | U.S.S.R. | 407/113 |

Primary Examiner—Lowell A. Larson
Assistant Examiner—Jerry Kearns
Attorney, Agent, or Firm—Cushman, Darby & Cushman

[57] ABSTRACT

An insert cutter includes a body having at least one generally radially outwardly-opening recess disposed adjacent a forward end face thereof. A cutter insert is received in the recess. The insert is a polygonal shape having a front face, a rear face and side faces. Each corner portion where adjacent side faces intersect each other is removed to provide first and second corner faces. The insert has main cutting edges each defined by the front face and a respective one of the side faces, auxiliary cutting edges each defined by the front face and a respective one of the first corner faces, and corner cutting edges each defined by the front face and a respective one of the second corner faces. Each side face serves as a flank of a respective one of the main cutting edges with a positive clearance angle A. Each first corner face serves as a flank of a respective one of the auxiliary cutting edges with a positive clearance angle B. Each second corner face serves as a flank of a respective one of the corner cutting edges with a positive clearance angle C. The angles A, B and C are so selected as to satisfy $A<B<C$. The disposition of the insert is such that one set of the main, auxiliary and corner cutting edges are indexed in their machining positions, and such that an effective clearance angle of the indexed corner cutting edge with respect to a workpiece is generally equal to an effective clearance angle of the indexed main cutting edge with respect to the workpiece.

3 Claims, 30 Drawing Figures

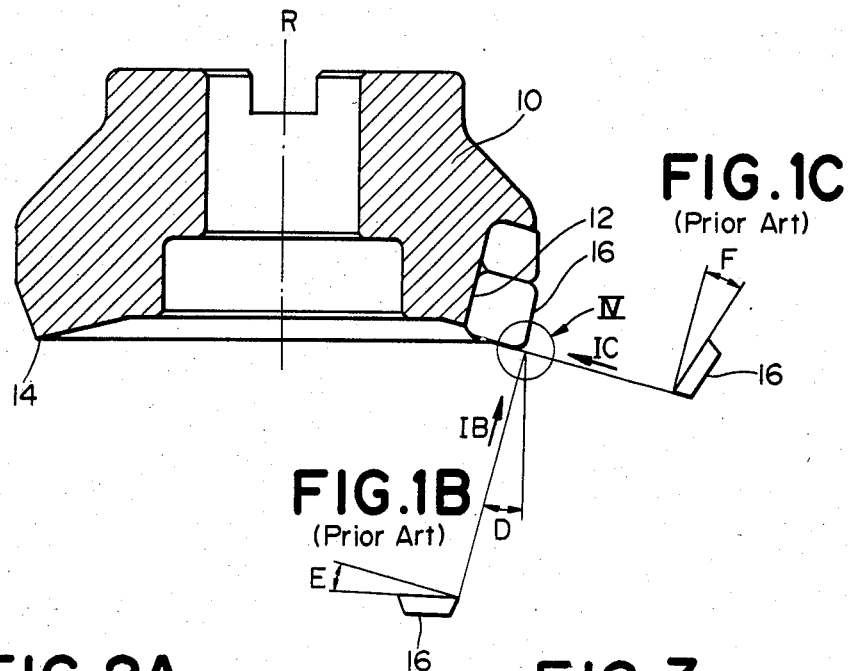
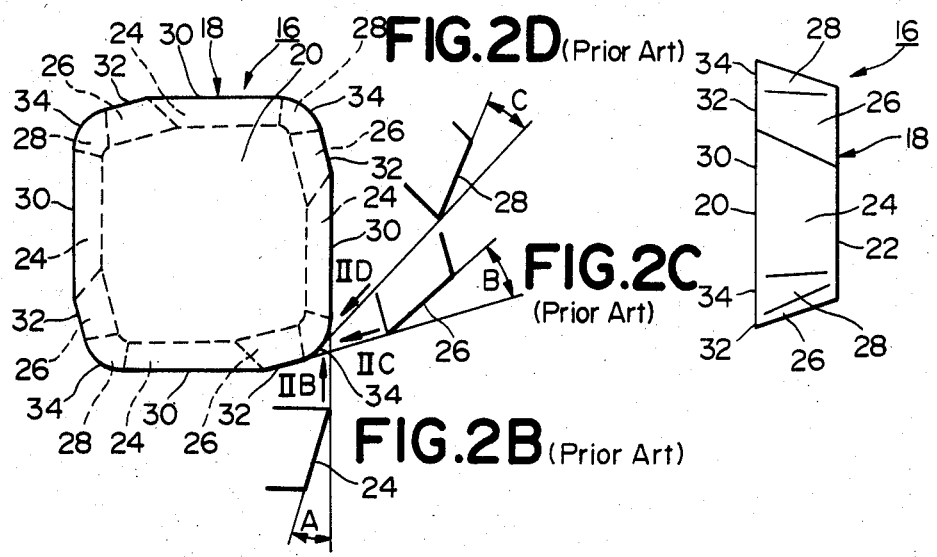

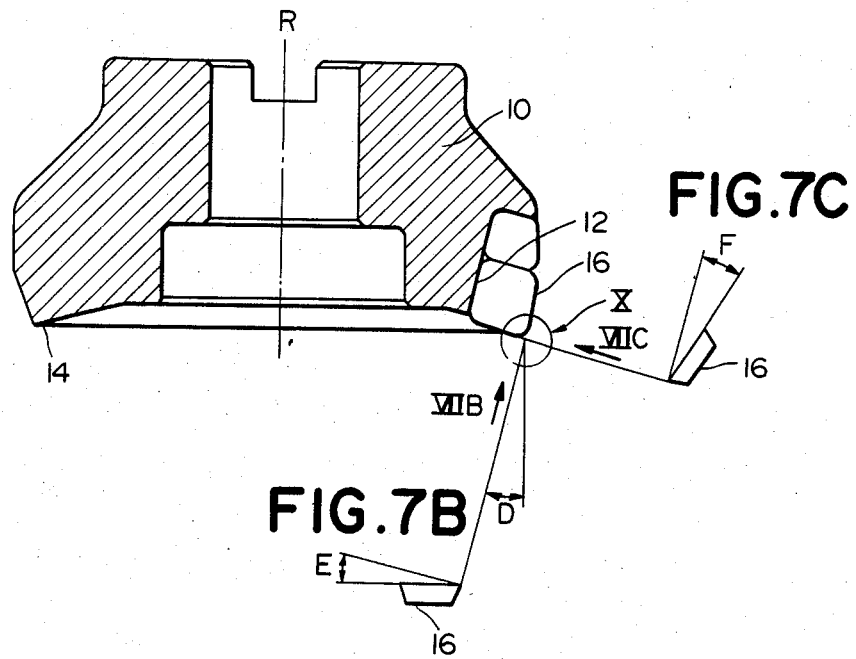
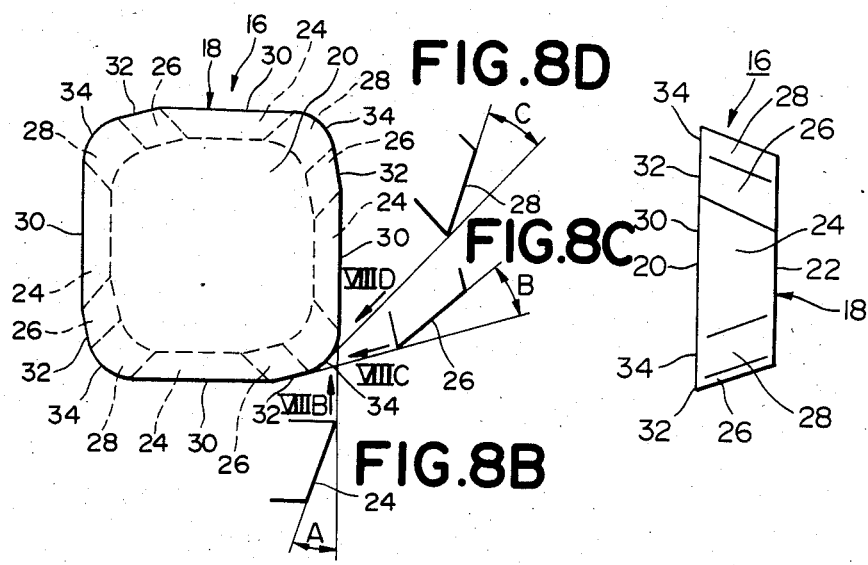

INSERT CUTTER

BACKGROUND OF THE INVENTION

1. Field of the Invention

The present invention relates to an insert rotary cutter having at least one indexable cutter insert; and more particularly to a cutter having a cutter insert of the type which includes a plurality of corner cutting edges each formed between a main cutting edge and an auxiliary cutting edge.

2. Prior Art

FIGS. 1A to 1C illustrate one conventional insert rotary cutter for processing a surface of a metal workpiece. The cutter includes a generally disk-shaped body 10 having an axis R of rotation therethrough. The body 10 has a plurality of pockets or recesses 12 disposed adjacent a forward end face 14 thereof in circumferentially spaced relation to one another, each recess 12 opening generally radially outwardly of the body 10. Received in and secured by suitable clamp means (not shown) to each recess 12 is an indexable cutter insert 16 of a hard wear resistant material, as best shown in FIGS. 2A to 2D and FIG. 3. The cutter insert 16 comprises a plate 18 of a generally square shape defined by a front face 20, a rear face 22 disposed parallel to the front face 20, and four side faces 24. Each corner portion of the plate 18 where adjacent side faces 24 intersect each other is removed to provide a first chamfered corner face 26 and a second rounded corner face 28, the first corner face 26 and the second corner face 28 being disposed adjacent each other. The plate 18 has four main cutting edges 30 each defined by the front face 20 and a respective one of the side faces 24, four auxiliary cutting edges 32 each defined by the front face 20 and a respective one of the first corner faces 26, and four corner cutting edges 34 each defined by the front face 20 and a respective one of the second corner faces 28. Each side face 24 is sloping inwardly in a direction away from the front face 20 and serves as a flank of a respective one of the main cutting edges 30 with a positive clearance angle A. Also, each first corner face 26 is sloping inwardly in a direction away from the front face 20 and serves as a flank of a respective one of the auxiliary cutting edges 32 with a positive clearance angle B. Further, each second corner face 28 is sloping inwardly in a direction away from the front face 20 and serves as a flank of a respective one of the corner cutting edges 34 with a positive clearance angle C. The clearance angle B of the flank 26 of each auxiliary cutting edge 32 is selected to be not less than the clearance angle A of the flank 24 of each main cutting edge 30. This is because the cutting loads acting on the auxiliary cutting edges 32 are smaller than those acting on the main cutting edges 30, so that the auxiliary cutting edges 32 require less strength than the main cutting edges 30, and hence it is possible to use larger clearance angles B for the auxiliary cutting edges 32 to obtain good cutting performance. In addition, the corner cutting edges 34 are provided mainly for preventing the main and auxiliary cutting edges 30 and 32 from being damaged, and the clearance angle C of the flank 28 of each corner cutting edge 34 is conventionally selected to be not less than the clearance angle A of the flank 24 of each main cutting edge 30 and not more than the clearance angle B of the flank 26 of each auxiliary cutting edge 32 simply because each corner cutting edge 34 is, as shown in FIG. 2A, disposed between the main cutting edge 30 and the auxiliary cutting edge 32. Thus, the clearance angles A, B and C are so selected as to satisfy $A \leq C \leq B$. Each cutter insert 16 is disposed in such a manner that one set of main, auxiliary and corner cutting edges 30, 32 and 34 are indexed in their machining positions, respectively, and that suitable corner angle D, true rake angle E and inclination angle F are, as shown in FIGS. 1A to 1C, provided to obtain good cutting performance, these angles D, E and F being selected to be positive.

In the prior art rotary cutter aforementioned, a circumferential clearance angle of each indexed corner cutting edge 34 with respect to the workpiece, which will be hereinafter referred to as an effective clearance angle $C_e$, is, as shown in FIGS. 4 to 6, smaller than a circumferential clearance angle of each indexed main cutting edge 30 with respect to the workpiece, which will be also referred to as an effective clearance angle $A_e$. As a result, the indexed corner cutting edge 34 is subjected to larger flank wear than the indexed main cutting edge 30 is, so that the corner cutting edge 34 is susceptible to damage earlier than the main cutting edge 30, thereby the service life of the insert 16 becoming short. In addition, the machined surface of the workpiece is liable to be rough.

SUMMARY OF THE INVENTION

It is therefore the object of the present invention to provide an insert cutter having at least one cutter insert which includes corner cutting edges which are subjected to less flank wear, thereby prolonging a service life of the insert and improving the cutting performance.

According to the present invention, there is provided an insert cutter for processing a metal workpiece comprising a body of a generally circular cross-section having an axis of rotation therethrough, the body having at least one generally radially outwardly-opening recess disposed adjacent a forward end face thereof, and a cutter insert received in and secured to the recess, the insert comprising a generally polygonal plate having a front face, a rear face and a plurality of side faces, each corner portion of the plate where adjacent side faces intersect each other being removed to provide first and second corner faces, the first corner face and the second corner face being disposed adjacent each other, the plate having a plurality of main cutting edges each defined by the front face and a respective one of the side faces, a plurality of auxiliary cutting edges each defined by the front face and a respective one of the first corner faces, and a plurality of corner cutting edges each defined by the front face and a respective one of the second corner faces, each side face serving as a flank of a respective one of the main cutting edges with a positive clearance angle A, each first corner face serving as a flank of a respective one of the auxiliary cutting edges with a positive clearance angle B, each second corner face serving as a flank of a respective one of the corner cutting edges with a positive clearance angle C, the clearance angles A, B and C being so selected as to satisfy $A < B < C$, the disposition of the insert being such that one set of main, auxiliary and corner cutting edges thereof are indexed in their machining positions with predetermined true rake, inclination and corner angles, and such that an effective clearance angle of the indexed corner cutting edge with respect to the workpiece is generally equal to an effective clearance angle of the indexed main cutting edge with respect to the workpiece.

BRIEF DESCRIPTION OF THE DRAWINGS

While the specification concludes with claims which particularly point out and distinctly define the subject matter which is regarded as the invention, it is believed that the invention will be more clearly understood from the following detailed description and the accompanying figures of the drawings.

In the drawings:

FIG. 1A is a cross-sectional view of a conventional insert cutter having square cutter inserts;

FIG. 1B is a view seen in the direction indicated by arrow IB of FIG. 1A;

FIG. 1C is a view seen in the direction indicated by arrow IC of FIG. 1A;

FIG. 2A is a plan view of the square insert;

FIG. 2B is a view seen in the direction indicated by arrow IIB of FIG. 2A;

FIG. 2C is a view seen in the direction indicated by arrow IIC of FIG. 2A;

FIG. 2D is a view seen in the direction indicated by arrow IID of FIG. 2A;

FIG. 3 is a side elevational view of the insert of FIG. 2A;

FIG. 7A is a cross-sectional view of an insert cutter in accordance with the present invention;

FIG. 7B is a view seen in the direction indicated by arrow VIIB of FIG. 7A;

FIG. 7C is a view seen in the direction indicated by arrow VIIC of FIG. 7A;

FIG. 8A is a plan view of a cutter insert employed in the cutter in accordance with the present invention;

FIG. 8B is a view seen in the direction indicated by arrow VIIIB of FIG. 8A;

FIG. 8C is a view seen in the direction indicated by arrow VIIIC of FIG. 8A;

FIG. 8D is a view seen in the direction indicated by arrow VIIID of FIG. 8A;

FIG. 9 is a side elevational view of the insert of FIG. 8A;

FIG. 17B is a view seen in the direction indicated by arrow XVIIB of FIG. 17A;

FIG. 17C is a view seen in the direction indicated by arrow XVIIC of FIG. 17A; and FIG. 17D is a view seen in the direction indicated by arrow XVIID of FIG. 17A.

DESCRIPTION OF PREFERRED EMBODIMENT OF THE INVENTION

Figure 4:
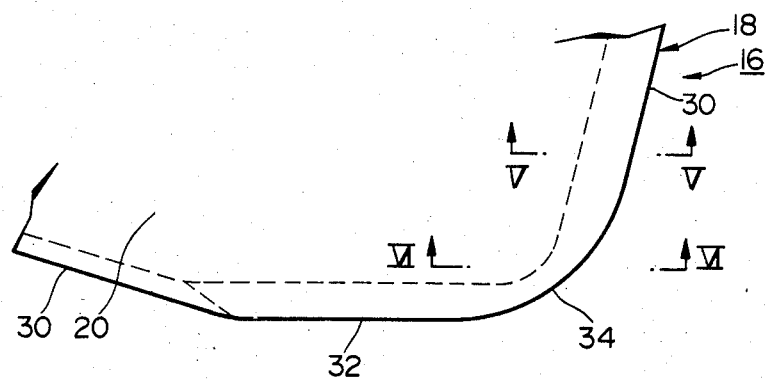
FIG. 4 is an enlarged view of the encircled portion indicated by arrow IV of FIG. 1A.
Figures 5, 6:
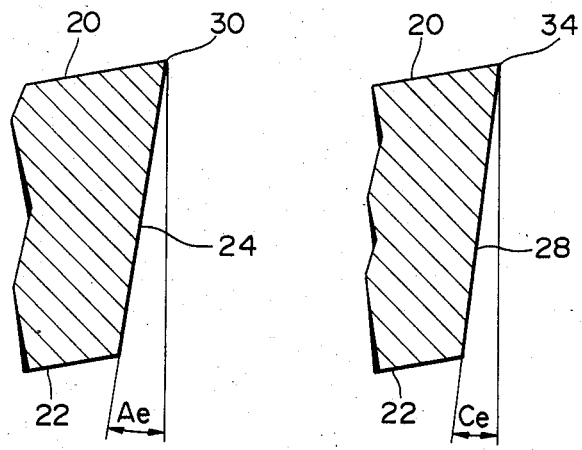
FIG. 5 is a cross-sectional view taken along the line V—V of FIG. 4.
FIG. 6 is a cross-sectional view taken along the line VI—VI of FIG. 4.
Figure 10:
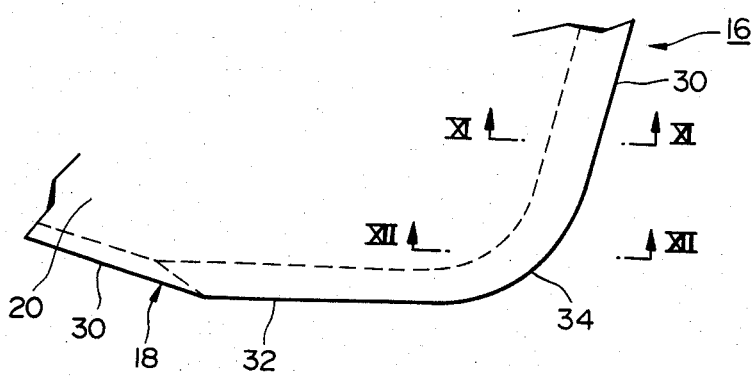
FIG. 10 is an enlarged view of the encircled portion indicated by arrow X of FIG. 7A.
Figure 11:
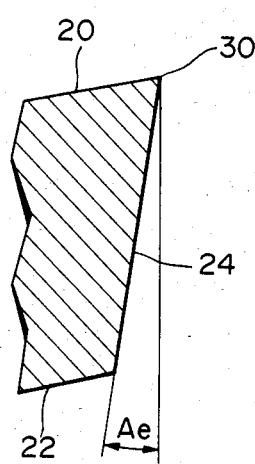
FIG. 11 is a cross-sectional view taken along the line XI—XI of FIG. 10.
Figure 12:
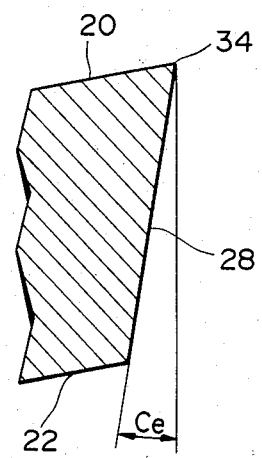
FIG. 12 is a cross-sectional view taken along the line XII—XII of FIG. 10.

Referring to FIGS. 1A to 1C, there is illustrated one embodiment of an insert cutter in accordance with the present invention. The same parts as or similar parts to those of the prior art cutter are designated by the same reference characters, and repeated explanations thereon will now be omitted. Employed in the cutter in accordance with the present invention are a plurality of cutter inserts 16 each of which is similar to the prior art insert, except that the clearance angle C of the flank 28 of each corner cutting edge 34 is so selected as to be larger than the clearance angle B of the flank 26 of each auxiliary cutting edge 32, the clearance angle B being larger than the clearance angle A. Each cutter insert 16 is disposed in the same manner as in the prior art cutter, i.e., in such a manner that one set of main, auxiliary and corner cutting edges 30, 32 and 34 are indexed in their machining positions, respectively, and that the suitable corner angle D, true rake angle E and inclination angle F are obtained. The corner angle D is preferably selected to be in the range of between 0° and 60°. The true rake angle E is preferably selected to be in the range of between 10° and 30°. The inclination angle F is preferably selected to be in the range of between 10° and 30°. As a result, in the cutter in accordance with the present invention, the effective clearance angle Ce of the indexed corner cutting edge 34 becomes larger than that of the insert in the prior cutter, and generally equal to the effective clearance angle Ae of the indexed main cutting edge 30, as shown in FIGS. 10 to 12. As a result, wear to which the flank 28 of the indexed corner cutting edge 34 is subjected during cutting operation is substantially reduced to the amount almost equal to wear to which the flank 24 of the indexed main cutting edge 30 is subjected, so that the service life of the insert 16 is prolonged and the surface of the workpiece has a good finish. The present invention will be more easily understood by the following example.

EXAMPLE

Figure 13:
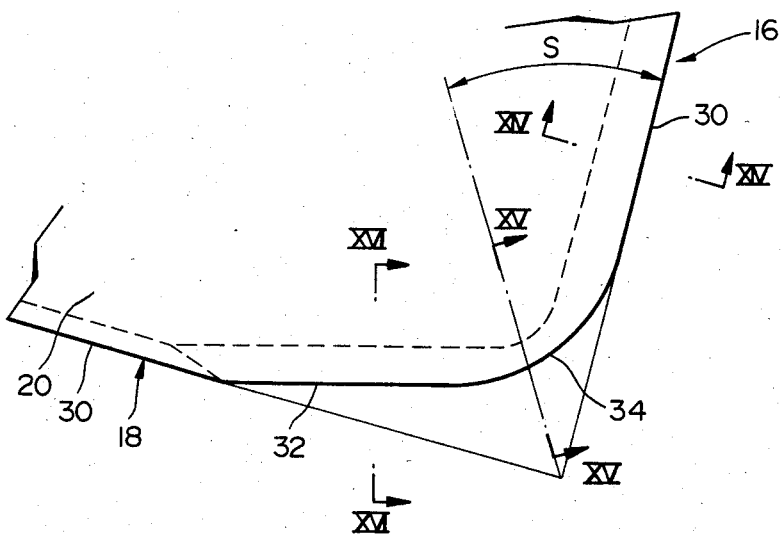
FIG. 13 is a view similar to FIG. 4 or FIG. 10, showing cutter inserts employed in EXAMPLE for facilitating the understanding of the present invention.
Figure 14:
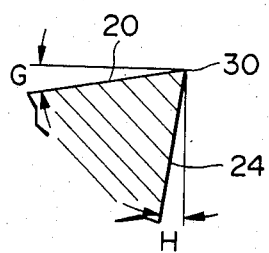
FIG. 14 is a cross-sectional view taken along the line XIV—XIV of FIG. 13.
Figure 15:
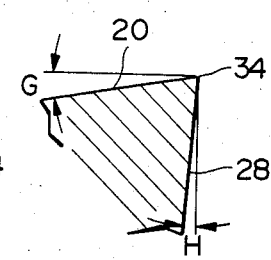
FIG. 15 is a cross-sectional view taken along the line XV—XV of FIG. 13.

Rake and clearance angles G and H of the indexed main, auxiliary and corner cutting edges 30, 32 and 34 with respect to the workpiece were calculated for two cutter inserts of the prior art cutter which inserts have clearance angles A, B and C selected to satisfy $A \leq C \leq B$ and for one insert of the cutter in accordance with the present invention which insert has clearance angles A, B and C selected to satisfy $A < B < C$, respectively. For simplicity of the calculation, the rake and clearance angles G and H for the indexed main cutting edge 30 being in a plane perpendicular to the main cutting edge 30 were calculated. The rake angle G of the indexed main cutting edge 30 as shown in FIG. 14 was equal to the true rake angle E thereof as shown in FIGS. 1B or 7B. Since the sum of the rake angle G and the clearance angle H of the indexed main cutting edge 30 with respect to the workpiece was equal to the clearance angle A of the main cutting edge 30 of the insert 16, the clearance angle H was calculated by the equation $H = A - G$. For the corner cutting edge 34, the rake and clearance angles G and H being in a plane inclined with respect to the main cutting edge 30 at a synthetic angle S (an angle in which the true rake angle E and the inclination angle F are, as shown in FIG. 13, represented as one angle) were calculated. In this case, the synthetic angle S and the rake angle G were obtained by the following equations:

$$\tan S = \tan E \cot F$$

$$\tan G = \tan F \cos S + \tan E \sin S$$

And the clearance angle H was obtained by $$H = C - G$$

Figure 16:
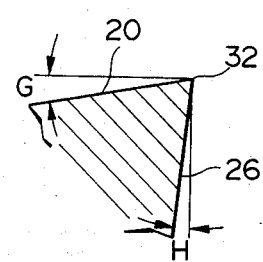
FIG. 16 is a cross-sectional view taken along the line XVI—XVI of FIG. 13.
Figure 17A:
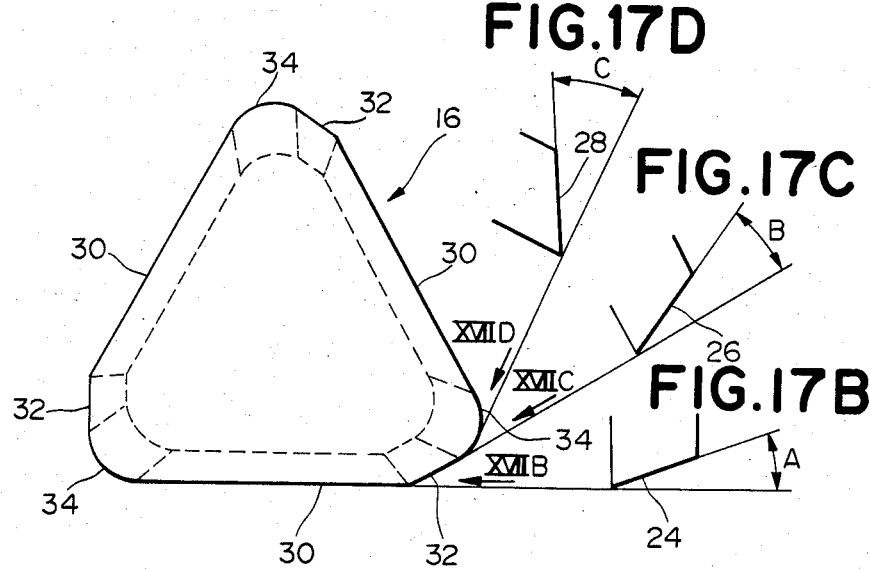
FIG. 17A is a plan view showing a modified cutter insert.

As to the auxiliary cutting edge 32 shown in FIG. 16, the rake and clearance angles G and H in a plane perpendicular to the auxiliary cutting edge 32 were calculated. The rake angle G was obtained by the following Kronenberg's equation:

$$\tan G = \tan F \cos D + \tan E \sin D$$

and, the clearance angle H was calculated by $$H = B - G$$

The rake and clearance angles G and H calculated as stated above will be shown in TABLE, in which Examples I and II show the results of the two cutter inserts of the prior art cutter while Example III shows that of the insert of the cutter in accordance with the present invention.

As clearly seen in TABLE, the clearance angles H of the indexed corner cutting edges 34 are considerably smaller than those of the indexed main cutting edges 30 in Examples I and II, while in Example III, the clearance angle H of the indexed corner cutting edge 34 is slightly larger than that of the indexed main cutting edge 30. In this manner, by virtue of the larger clearance angle C of the corner cutting edge 34 of the insert 16 than the clearance angle B of the auxiliary cutting edge 32 thereof, the clearance angle H of the corner cutting edge 34 with respect to the workpiece are increased to an angle slightly larger than the clearance angle H of the main cutting edge 30 with respect to the workpiece. Accordingly, the wear to which the flank 28 of the indexed corner cutting edge 34 of the insert 16 is subjected is reduced to an amount almost equal to wear to which the flank 24 of the indexed main cutting edge 30 is subjected, so that the service life of the insert 16 will be prolonged and the cutting performance will be improved.

TABLE

| Examples | I (prior art) | | II (prior art) | | III (invention) | |
|---|---|---|---|---|---|---|
| insert clearance angles | A = C = B<br>A = 20°<br>C = 20°<br>B = 20° | | A < C < B<br>A = 20°<br>C = 22°<br>B = 25° | | A < B < C<br>A = 20°<br>C = 25°<br>B = 22° | |
| rake angle G clearance angle H | G | H | G | H | G | H |
| main cutting edges | 12° | 8° | 10° | 10° | 12° | 8° |
| corner cutting edges | 16°44' | 3°16' | 17°47' | 4°13' | 16°44' | 8°16' |
| auxiliary cutting edges | 14°36' | 5°24' | 16°56' | 8°04' | 14°36' | 7°24' |
| corner angles D | 15° | | 15° | | 15° | |
| true rake angles E | 12° | | 10° | | 12° | |
| inclination angles F | 12° | | 15° | | 12° | |

While each insert 16 considered in the aforementioned embodiment has been of the square shape, it may be of a triangular shape, as shown in FIG. 17A to 17D. Also in such a triangular insert, the clearance angles A, B and C of the main, auxiliary and corner cutting edges 30, 32 and 34 are so selected as to satisfy A<B<C, and the disposition of each insert with respect to the body 10 is similar to that in the aforementioned embodiment.

Obviously many modifications and variations of the present invention are possible in the light of the above teachings. It is therefore to be understood that within the scope of the appended claims, the invention may be practiced otherwise than as specifically described.

What is claimed is:

1. An insert cutter for processing a metal workpiece comprising:
    a body of a generally circular cross-section having an axis of rotation therethrough, said body having at least one generally radially outwardly-opening recess disposed adjacent a forward end face thereof; and
    a cutter insert received in and secured to said recess, said insert comprising a generally polygonal plate having a front face, a rear face and a plurality of side faces, each corner portion of said plate where adjacent side faces intersect each other being removed to provide first and second corner faces, said first corner face and said second corner face being disposed adjacent each other, said plate having a plurality of main cutting edges each defined by said front face and a respective one of said side faces, a plurality of auxiliary cutting edges each defined by said front face and a respective one of said first corner faces, and a plurality of corner cutting edges each defined by said front face and a respective one of said second corner faces, each side face serving as a flank of a respective one of said main cutting edges with a positive clearance angle A, each first corner face serving as a flank of a respective one of said auxiliary cutting edges with a positive clearance angle B, each second corner face serving as a flank of a respective one of said corner cutting edges with a positive clearance angle C, said clearance angles A, B and C being so selected as to satisfy A<B<C;
    the disposition of said insert being such that one set of main, auxiliary and corner cutting edges thereof are indexed in their machining positions with predetermined true rake, inclination and corner angles, and such that an effective clearance angle of said indexed corner cutting edge with respect to said workpiece is generally equal to an effective clearance angle of said indexed main cutting edge with respect to said workpiece.

2. An insert cutter according to claim 1, in which each cutter insert has a quadrilateral shape.

3. An insert cutter according to claim 1, in which each cutter insert has a triangular shape.

* * * * *